US008907986B2

(12) United States Patent
Hunt et al.

(10) Patent No.: US 8,907,986 B2
(45) Date of Patent: Dec. 9, 2014

(54) SYSTEM AND METHOD OF SWITCHING BETWEEN MULTIPLE VIEWING MODES IN MULTI-HEAD COMPUTER SYSTEM

(75) Inventors: Peter D. Hunt, Spring, TX (US); Lan Wang, Cypress, TX (US); Pablo J. Salazar, Spring, TX (US); Mark E. Baerenstecher, Tomball, TX (US); Vali Ali, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1038 days.

(21) Appl. No.: 12/356,655

(22) Filed: Jan. 21, 2009

(65) Prior Publication Data
US 2009/0187677 A1    Jul. 23, 2009

Related U.S. Application Data

(62) Division of application No. 10/214,818, filed on Aug. 8, 2002, now Pat. No. 7,952,569.

(51) Int. Cl.
G09G 5/00 (2006.01)
G06F 1/16 (2006.01)
G06F 3/00 (2006.01)
G06F 3/0354 (2013.01)
G06F 3/0488 (2013.01)

(52) U.S. Cl.
CPC ............ *G06F 3/0488* (2013.01); *G06F 1/1626* (2013.01); *G06F 3/03545* (2013.01); *G06F 2200/1614* (2013.01); *G06F 1/166* (2013.01); *G06F 1/1669* (2013.01); *G06F 1/1671* (2013.01); *G06F 1/1656* (2013.01); *G06F 1/169* (2013.01); *G06F 1/1632* (2013.01)
USPC .......................................... 345/659

(58) Field of Classification Search
CPC ................................................ G06F 2200/1614
USPC .......................................... 345/659
See application file for complete search history.

(56) References Cited

U.S. PATENT DOCUMENTS

| 4,542,377 A | 9/1985 | Hagen et al. |
| 4,831,368 A | 5/1989 | Masimo et al. |
| 5,134,390 A | 7/1992 | Kishimoto et al. |
| 5,173,940 A | 12/1992 | Lantz et al. |
| D343,168 S | 1/1994 | Morisaki et al. |
| 5,329,289 A | 7/1994 | Sakamoto et al. |

(Continued)

OTHER PUBLICATIONS

One-Click Mobility Client Overview, Mar. 8, 2002, 2002—Pocket Presence AB, pp. 11.

(Continued)

*Primary Examiner* — Jeffery A Brier
(74) *Attorney, Agent, or Firm* — Hewlett-Packard Patent Department

(57) ABSTRACT

The present technique provides a system and method for automatically switching a computer system between multiple display profiles in response to a system event, such as a hardware event. The present technique detects the system event, identifies the hardware configuration of the computer system, and automatically reconfigures the computer system to accommodate the hardware configuration in real-time. The system event may be a physical rotation of a display between landscape and portrait orientations or between viewing and writing orientations. The system event also may be a physical docking or undocking of a first computing device with a second device in a variety of mounting positions. Any suitable sensor, switch, or hardware/software detection mechanism may be used for the foregoing event detection.

12 Claims, 12 Drawing Sheets

(56) References Cited

U.S. PATENT DOCUMENTS

| | | |
|---|---|---|
| 5,337,212 A | 8/1994 | Bartlett et al. |
| 5,436,792 A | 7/1995 | Leman et al. |
| 5,535,093 A | 7/1996 | Noguchi et al. |
| 5,537,531 A | 7/1996 | Suga et al. |
| 5,596,697 A | 1/1997 | Foster et al. |
| 5,640,176 A | 6/1997 | Mundt et al. |
| 5,682,529 A * | 10/1997 | Hendry et al. ............... 713/100 |
| 5,708,458 A | 1/1998 | Vrbanac |
| 5,708,561 A | 1/1998 | Huilgol et al. |
| 5,774,233 A | 6/1998 | Sakamoto |
| 5,790,120 A | 8/1998 | Lozares et al. |
| 5,841,424 A | 11/1998 | Kikinis |
| 5,845,282 A | 12/1998 | Alley et al. |
| 5,859,628 A | 1/1999 | Ross et al. |
| 5,889,964 A | 3/1999 | Cho et al. |
| 5,899,421 A | 5/1999 | Silverman |
| 5,903,254 A | 5/1999 | Mundt et al. |
| 5,923,528 A | 7/1999 | Lee |
| 5,941,493 A | 8/1999 | Cheng |
| 5,973,664 A | 10/1999 | Badger et al. |
| 5,991,897 A | 11/1999 | Perugini et al. |
| 5,995,139 A | 11/1999 | Lee |
| 6,061,104 A | 5/2000 | Evanicky et al. |
| 6,125,449 A | 9/2000 | Taylor et al. |
| 6,137,468 A | 10/2000 | Martinez et al. |
| 6,157,958 A | 12/2000 | Armitage et al. |
| 6,189,842 B1 | 2/2001 | Bergeron Gull et al. |
| 6,189,850 B1 | 2/2001 | Liao et al. |
| 6,208,996 B1 | 3/2001 | Ben-Shachar et al. |
| 6,209,088 B1 | 3/2001 | Reneris |
| 6,268,845 B1 | 7/2001 | Pariza et al. |
| 6,275,932 B1 | 8/2001 | Yamaguchi et al. |
| 6,289,466 B1 | 9/2001 | Bayramoglu et al. |
| 6,301,101 B1 | 10/2001 | Anzai et al. |
| 6,326,978 B1 | 12/2001 | Robbins |
| 6,331,867 B1 | 12/2001 | Eberhard et al. |
| 6,336,142 B1 | 1/2002 | Kato et al. |
| 6,343,006 B1 | 1/2002 | Moscovitch et al. |
| 6,366,450 B1 | 4/2002 | Janicek |
| 6,385,668 B1 | 5/2002 | Gaddess et al. |
| 6,418,010 B1 | 7/2002 | Sawyer |
| 6,426,872 B1 | 7/2002 | Sutton et al. |
| 6,437,975 B1 | 8/2002 | Huang |
| 6,443,408 B1 | 9/2002 | Hung |
| 6,477,588 B1 | 11/2002 | Yerazunis et al. |
| D469,091 S | 1/2003 | Hasegawa et al. |
| 6,504,710 B2 | 1/2003 | Sutton et al. |
| 6,522,529 B1 | 2/2003 | Huilgol et al. |
| 6,523,125 B1 | 2/2003 | Kohno et al. |
| 6,567,101 B1 | 5/2003 | Thomas |
| 6,583,984 B2 | 6/2003 | Yin et al. |
| 6,633,976 B1 | 10/2003 | Stevens |
| 6,639,788 B1 | 10/2003 | Liao et al. |
| 6,691,187 B1 | 2/2004 | Schwerin |
| 6,727,830 B2 | 4/2004 | Lui et al. |
| 6,763,458 B1 | 7/2004 | Watanabe et al. |
| 6,771,494 B2 | 8/2004 | Shimano |
| 6,781,604 B2 | 8/2004 | Poynter |
| 6,788,527 B2 | 9/2004 | Doczy et al. |
| 6,795,966 B1 | 9/2004 | Lim et al. |
| 6,856,506 B2 | 2/2005 | Doherty et al. |
| 6,874,744 B2 | 4/2005 | Rawlings et al. |
| 6,888,532 B2 | 5/2005 | Wong et al. |
| 6,895,515 B1 | 5/2005 | Yamazaki |
| 7,025,274 B2 | 4/2006 | Solomon et al. |
| 7,089,487 B2 | 8/2006 | Tsai |
| 7,209,124 B2 | 4/2007 | Hunt et al. |
| 7,542,052 B2 * | 6/2009 | Solomon et al. ............... 345/659 |
| 2001/0011302 A1 | 8/2001 | Son |
| 2001/0025289 A1 | 9/2001 | Jenkins et al. |
| 2002/0024499 A1 | 2/2002 | Karidis et al. |
| 2002/0068558 A1 | 6/2002 | Janik |
| 2002/0130836 A1 | 9/2002 | Ohmori et al. |
| 2002/0135977 A1 | 9/2002 | Yin et al. |
| 2002/0184395 A1 | 12/2002 | LeFevre et al. |
| 2003/0122882 A1 | 7/2003 | Kho |
| 2003/0162152 A1 | 8/2003 | Lee |
| 2003/0222848 A1 | 12/2003 | Solomon et al. |
| 2003/0234797 A1 | 12/2003 | Williams et al. |
| 2003/0236935 A1 | 12/2003 | Amemiya et al. |
| 2003/0236971 A1 | 12/2003 | Rothman et al. |
| 2004/0017652 A1 | 1/2004 | Billington et al. |
| 2004/0021678 A1 | 2/2004 | Ullah et al. |
| 2004/0047505 A1 | 3/2004 | Ghassabian |
| 2004/0051726 A1 | 3/2004 | Martyn |

OTHER PUBLICATIONS

Compaq, Aero 1500/2100 Pocket PC Reference Guide, Mar. 2000, pp. 41.

Document Reference Citation: JP Patent Abstract 2001041690; Japan Servo Co Ltd; 2.

Document Reference Citation: JP Patent Abstract 62248845; Seiko; 2.

* cited by examiner

SYSTEM AND METHOD OF SWITCHING BETWEEN MULTIPLE VIEWING MODES IN MULTI-HEAD COMPUTER SYSTEM

CROSS REFERENCE TO RELATED APPLICATIONS

This application is a divisional application of U.S. patent application Ser. No. 10/214,818 filed Aug. 8, 2002 now U.S. Pat. No. 7,952,569.

FIELD OF THE INVENTION

The present technique relates generally to computer systems and, more particularly, to display configuration systems. The present technique provides a system and method for automatically switching in real-time between multiple display profiles in response to a system event, such as a dock/undock event.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer systems and other electronics often have monitors or displays, which have a fixed viewing orientation. For example, conventional monitors mount on a desktop in a landscape orientation. The bulk of these monitors generally precludes rotation of the monitor between multiple viewing orientations. In contrast, flat-panel displays and portable electronics having flat-panel displays may be rotated between multiple viewing orientations, such as the conventional landscape orientation and a portrait orientation (i.e., a 90 degree rotation of the display). After physically rotating the display, the user must manually change the viewing orientation of the display by interacting with software on the electronic/computing device coupled to the display. For example, the manual change in viewing orientations may be executed by Nview, which is a software application provided by Nvidia Corporation of Santa Clara, Calif.

BRIEF DESCRIPTION OF THE DRAWINGS

Exemplary embodiments will hereafter be described with reference to the accompanying drawings, wherein life reference numerals denote like elements, and.

DETAILED DESCRIPTION OF SPECIFIC EMBODIMENTS

Figure 1:
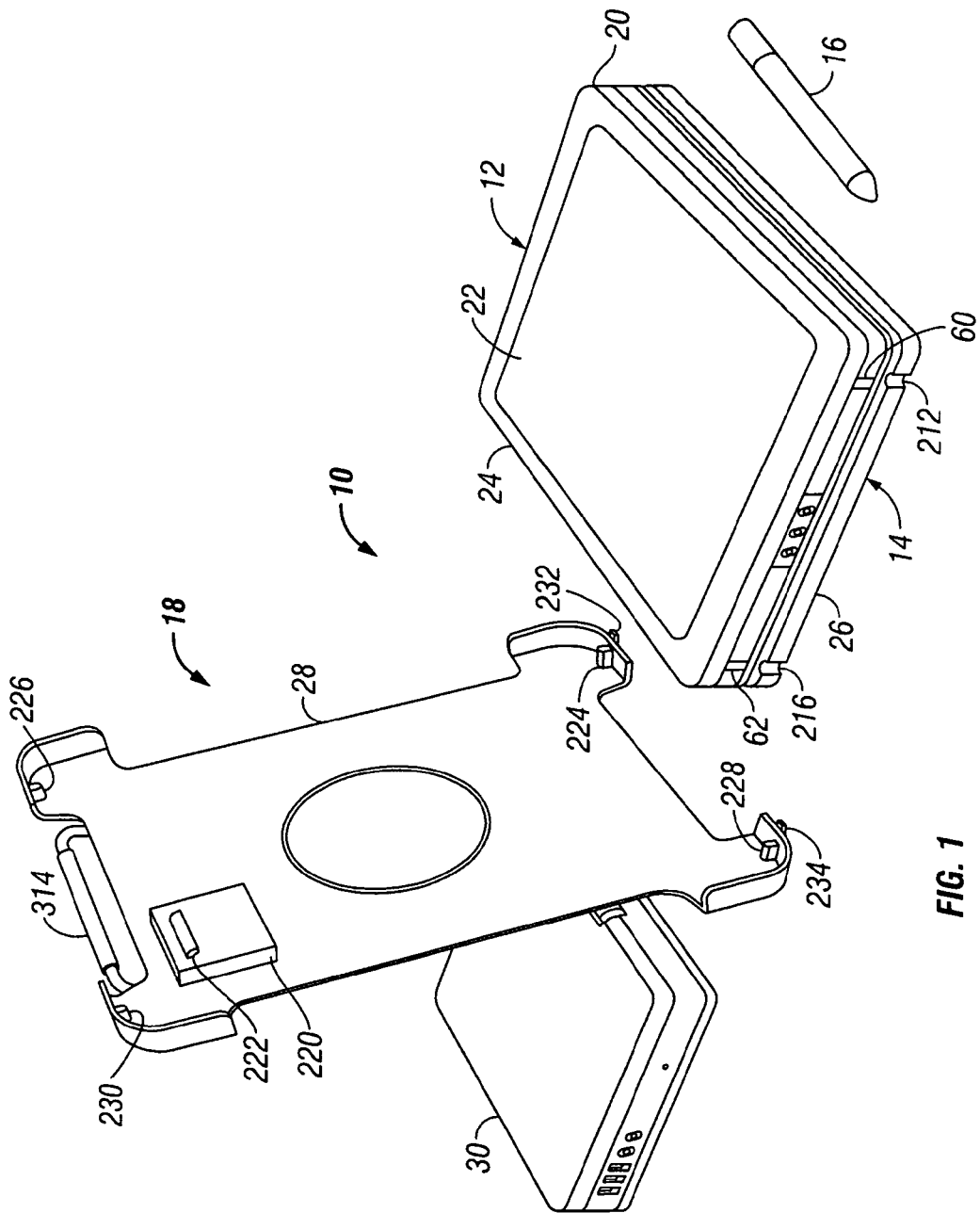
FIG. 1 is a perspective view of an exemplary tablet computer system having a tablet computing device, a multi-attachable keyboard, a digitizing pointing device, and a multi-configurable docking assembly.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique provides a system and method for responding to system event, such as a hardware reconfiguration, in real-time to reconfigure a computer system automatically in response to the system event. For example, the present technique may detect an installation, removal, connection, disconnection, or reconfiguration of a hardware component during operation of the computer system. Based on the detected event, the present technique identifies the hardware configuration of the computer system and automatically reconfigures the computer system to accommodate the hardware configuration in real-time. The system event may be a physical rotation of a display between landscape and portrait orientations or between viewing and writing orientations. The system event also may be a physical docking or undocking of a first computing device with a second device in a variety of mounting positions. The present technique is responsive to the system event in real-time, providing a real-time adaptation of the computer system to the new system configuration.

In an exemplary embodiment, the present technique provides a plurality of viewing/display profiles for various different configurations of the computer system. Each viewing/display profile may have a variety of viewing/display settings, such as color depth, display resolution, screen orientation, primary or secondary screens of multi-display system, background image, color scheme and layout for applications, user settings, active applications, and various other settings. If an event is detected at boot-up or during operation of the computer system, then the appropriate viewing/display profile is used to reconfigure or reinitialize the system to adapt to the new system configuration. Advantageously, the present technique may perform the reconfiguration in real-time to provide automatic adaptation to the new system configuration. For example, the operating system may originally configure the hardware and software resources in a default profile, which may be subsequently reconfigured or switched with another profile during operation of the computer system in response to the system event.

FIG. 1 is a perspective view of an exemplary tablet computer system 10 of the present technique. In this exemplary embodiment, the tablet computer system 10 comprises a tablet computing device 12, a multi-attachable keyboard 14, a digitizing pointing device 16, and a multi-configurable docking assembly 18. However, the tablet computer system 10 may comprise any other suitable components or peripherals, or it may simply comprise the tablet computing device 12. The foregoing components are intended to provide a relatively flexible and multi-configurable computing system, which allows multiple angular, elevational, and orientational positions of the various components of the table computing system 10. Accordingly, a user may select the desired components and adapt the tablet computing system 10 to a desired environment, such as a variety of home, work, and mobile environments. Although not illustrated, the tablet computer system 10 also may comprise a variety of additional components and peripherals, such as a printer, a scanner, a digital camera, an external monitor, and various other input/output devices.

As illustrated, the tablet computing device 12 has a housing 20, which has a display screen assembly 22 disposed in a top side 24 of the housing 20, a plurality of computing components and circuitry disposed within the housing 20, and the multi-attachable keyboard 14 removably coupled to a bottom side 26 of the housing 20. The display screen assembly 22 may comprise any suitable flat panel display screen technology, including a variety of screen enhancement, antireflective, protective, and other layers. The display screen assembly 22 also may have touch panel technology, digitizer panel technology, and/or various other user-interactive screen technologies. As discussed in detail below, the digitizing pointing device 16 interacts with a digitizing panel 136 (e.g., see FIG. 4 for an exemplary digitizing mechanism) disposed in the top side 24 of the tablet computing device 12 (see FIG. 3). The digitizing panel may be disposed below, within, or adjacent the display screen assembly 22. In this exemplary embodiment, the digitizing panel 136 (see FIG. 4) extends to a peripheral area of the display screen assembly 22, where the tablet computing device 12 defines digitizer-activated buttons for desired computing functions. The tablet computing device 12 also may comprise a variety of user interaction circuitry and software, such as speech-to-text conversion software (i.e., voice recognition) and writing-to-text conversion software (e.g., for the digitizing pointing device 16). Accordingly, a user may interact with the tablet computing device 12 without a conventional keyboard or mouse.

The computing components disposed within the tablet style housing 20 may comprise a processor, a motherboard, volatile and nonvolatile memory (e.g., a hard drive, RAM, ROM, flash memory, cache memory, etc.), network circuitry (e.g., a modem, a network card, etc.), wireless communications circuitry (e.g., IR, RF, optical, blue tooth, and other technologies), input/output ports, audio/video circuitry, and various other circuitry, components, and component receptacles/bays. For example, the tablet computing device 12 and the multi-attachable keyboard 14, may comprise wireless communications circuitry, such as RF circuitry, such that the tablet computing device 12 may be used for wireless interaction with a wireless LAN or any other desired wireless input/output device remote from the tablet computing device 12. Moreover, the tablet computing system 10 may comprise a wireless microphone or wireless voice recognition headset to facilitate wireless user-interaction.

The multi-attachable keyboard 14 is attachable/detachable to the tablet computing device 12 in a variety of operable and storage locations, such as the storage location illustrated by FIG. 1. In each operable and storage location, the multi-attachable keyboard 14 also may be attachable/detachable in multiple orientations, which may be positionally securable or movable by a linear or rotational positioning assembly. However, the present technique provides a variety of attachment alignment structures to prevent undesirable or destructive coupling, or movement, of the tablet computing device 12 and the multi-attachable keyboard 14. In the storage attachment configuration of FIG. 1, the multi-attachable keyboard 14 may be coupled to the bottom side 26 of the tablet computing device 12 in a variety of configurations, such as keyboard-side facing inward or outward from the bottom side 26. However, in this exemplary embodiment, the tablet computing device 12 and the multi-attachable keyboard 14 comprise intercoupling structures to position and align the multi-attachable keyboard 14 such that the keyboard-side faces inward toward the bottom side 26. Accordingly, buttons and other physically movable user-interaction components of the multi-attachable keyboard 14 are protected in the stored keyboard position illustrated by FIG. 1. In operation, the keyboard-side of the multi-attachable keyboard 14 is accessible during user-interaction with the display screen assembly 22 of the tablet computing device 12.

The tablet computing device 12 and the multi-attachable keyboard 14 may be jointly or separately attachable to the multi-configurable docking assembly 18 at a support section 28, which is movably coupled to a base section 30. As described below, the support section 28 may be movable to a variety of angles, elevations, and orientations to enhance the user's interaction with the tablet computing device 12. For example, the support section 28 may be rotatable between portrait and landscape orientations and between horizontal and upright orientations. The tablet computer system 10 also may comprise a screen orientation switching mechanism, which may operate automatically or manually to switch the display orientation of the display screen assembly 22 between portrait and landscape orientations. Accordingly, as discussed in further detail below, the multi-configurable docking assembly 18 may trigger an automatic change in the viewing orientation upon moving the support section 28 between the portrait and landscape orientations, while the tablet computing device 12 is disposed in the docked configuration. This automatic switching mechanism reduces the user's tasks and ensures that text/images are always displayed in an upright/readable orientation for the user regardless of the physical orientation of the tablet computing device 12.

The tablet computing device 12 is further illustrated with reference to FIGS. 2-5. As illustrated by FIGS. 2A-2F, the tablet computing device 12 may have a variety of computing components and circuitry, input/output ports, functional buttons, status indicators, security mechanisms, component attachment mechanisms, component receptacles, and expansion slots. Although specific features and components are described in detail below, the present technique may utilize any suitable technology or components.

Figure 2A:
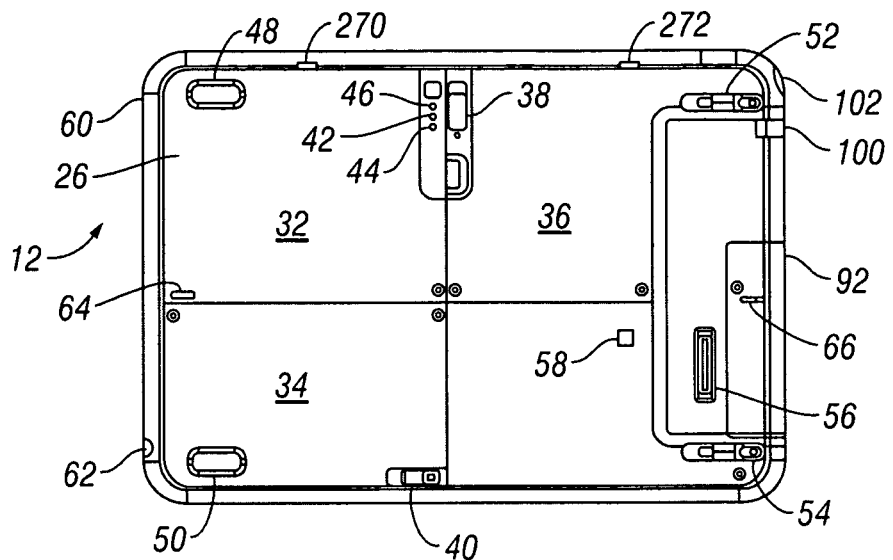
FIG. 2A is a bottom view of the tablet computing device.

FIG. 2A is a bottom view of the tablet computing device 12. As illustrated, the bottom side 26 has a plurality of component bays, such as bays 32, 34, and 36, which may house a battery, a hard drive, memory (e.g., RAM), or any other desired devices. The tablet computing device 12 also may have one or more device lock/release mechanisms to secure internal and external devices, such as the multi-attachable keyboard 14, a display screen cover assembly, a carrying handle, a battery, removable memory, or other such components. As illustrated, the tablet computing device 12 has an internal device lock/release mechanism 38 for one or more of the components disposed within the bays 32, 34, and 36. The tablet computing device 12 also has an external device lock/release mechanism 40, which is operable to lock and release the multi-attachable keyboard 14, a protective display screen cover, and other desired devices with external device mounting structures on the tablet computing device 12. Component test buttons and status indicators also may be provided to analyze one or more components, such as the components internally or externally secured to the tablet computing device 12 via the mechanisms 38 and 40. For example, the tablet computing device 12 has a component test button/indicator 42 and status buttons/indicators 44 and 46, which may be configured for analyzing the battery, the keyboard 14, or any other desired device.

As mentioned above, the tablet computing device 12 is configured for a stand-alone or a docked configuration in a plurality of orientations, such as portrait and landscape orientations in various angles relative to a support surface. For example, the computing device 12 may comprise a plurality of feet to mount the tablet computing device 12 onto a desired surface, such as a desktop, a wall, a user's lap, or any other support surface. In this exemplary embodiment, the tablet computing device 12 includes rubber feel 48 and 50 and adjustable feet 52 and 54, which may comprise any suitable height adjustment and locking mechanism (e.g., a flip-up mechanism with a slot-tab securement structure). For a docked configuration, the tablet computing device 12 comprises a docking connector 56 and a docking latch structure 58, which are intercoupleable with mating connector and latch structures on the multi-configurable docking assembly 18. As noted above, the tablet computing device 12 also may comprise one or more mounting alignment structures, such as docking alignment slots 60 and 62, which are intercoupleable in a single alignment orientation with mating alignment structures on the multi-configurable docking assembly 18. Similarly, alignment structures 64 and 66 may be disposed on the bottom side 26 of the tablet computing device 12 to align the keyboard 14, or other face-mountable devices, in a proper mount orientation with the tablet computing device 12. Moreover, the keyboard 14 or other face-mountable devices may be removably intercoupled with the bottom side 26 via the docking latch structure 58 or an edge-based latch mechanism.

Figure 2B:
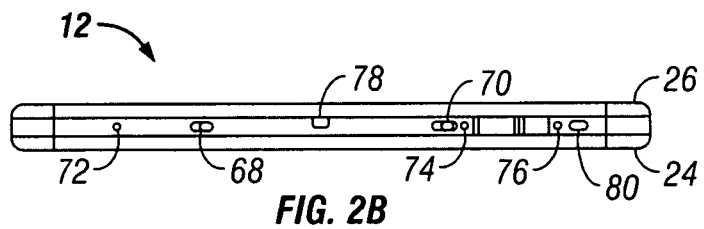
FIG. 2B-2E are side views of the tablet computing device.

FIG. 2B is a side view of the tablet computing device 12 illustrating such an edge based latch mechanism. As illustrated, the tablet computing device 12 has external device mount structures 68 and 70, which may comprise elongated slots having internal latch mechanisms. For example, the external device lock/release mechanism 40 may be moved to position slot-housed hook members between released and latched positions. Again, the tablet computing device 12 may have one or more attachment alignment mechanisms, such as alignment structures 72, 74, and 76, to ensure the proper attachment orientation of the external device, such as the multi-attachable keyboard 14 or a protective display cover. Accordingly, the alignment structure 72 is paired with the external device mount structure 68 and the alignment structures 74 and 76 are paired with the external device mount structure 70, such that a single mount orientation is supported.

One or more input/output ports also may be provided on the tablet computing device 12 to facilitate data exchange and communication with external devices or networks. For example, the tablet computing device 12 may have a communications port 78 in an accessible position relative to the external device mount structures 68 and 70. Accordingly, an external device mounted to the tablet computing device 12 is able to communicate with the tablet computing device 12 via the communications port 78, which may comprise any suitable port. For example, the port 78 may be a serial port, a parallel port, a USB port, a wireless port, an optical port, or any other desired port. The port 78 also may comprise hot-plugging technology to facilitate attachment and detachment during operation of the tablet computing device 12.

Security features also may be provided on various components of the tablet computer system 10. The system 10 may have one or more Kensington locks or other physical securement mechanisms for physically securing the various components to a desired fixture. For example, each of the components illustrated by FIG. 1 may comprise a security slot, which is intercoupleable with a cable lock. Moreover, the components of the present technique may comprise multi-stage locks that provide an option to intercouple the components jointly or separately to a desired fixture using a single lock mechanism. As illustrated by FIG. 2B, the tablet computing device 12 has a lock mechanism 80, such as a Kensington lock slot. The multi-attachable keyboard 14, the digitizing pointing device 16, and the multi-configurable docking assembly 18 may have similar lock mechanisms.

Figure 2C:
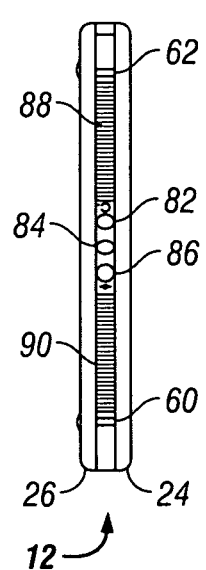

As illustrated by FIG. 2C, the tablet computing device 12 also may comprise a plurality of audio circuitry, such as audio ports 82, 84, and 86 and speakers 88 and 90. For example, the audio ports 82, 84, and 86 may comprise a headphone port, a cell phone port, and a microphone port, respectively. The tablet computing device 12 also may comprise a variety of video circuitry, such as a video input port, a video output port, and video processing circuitry for display on the display screen assembly 22 or an external monitor.

Figure 2D:
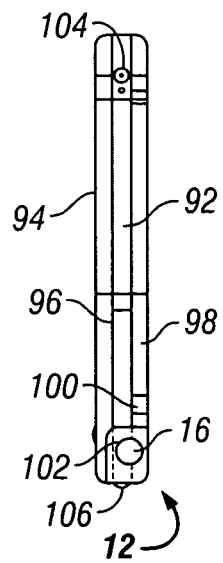

The tablet computing device 12 also may have one or more communications port panels, which may be exposed or concealable by a removable port panel cover. For example, as illustrated by FIG. 2D, the tablet computing device 12 has a flexible port panel door 92, which is rotatable away from the tablet computing device 12 to provide access to one or more communications ports or devices, such as serial, parallel, USB, or other ports. The flexible port panel door 92 also has a tool free latch mechanism 94, which removably couples a movable portion of the door 92 to the tablet computing device 12.

As illustrated by FIG. 2D, the tablet computing device 12 also may have a variety of edge-based component bays or receptacles, such as component receptacles 96, 98, 100, and 102. For example, the component receptacle 96 may house a PCMCIA device, such as a network card or an audio/video card. The component receptacle 98 may support a memory card, such as flash memory or other desired memory. In the illustrated embodiment, the component receptacle 100 houses a desired attachment for the digitizing pointing device 16, which is removably storable in the component receptacle 102. For example, a tether attachment may be removably disposed in the component receptacle 100.

Power control and management features also may be provided in the tablet computing device 12. As illustrated by FIG.

2D, the tablet computing device 12 may have one or more external power connectors, such as power connector 104, to support AC or DC power sources. The tablet computing device 12 also may have one or more power control buttons, such as power button 106, which may provide on/off, reset, and other power functionality. A power status and battery level indicator also may be incorporated into the tablet computing device 12. Moreover, one or more of the digitizer buttons described below may be associated with power management functions and software.

Figure 2E:
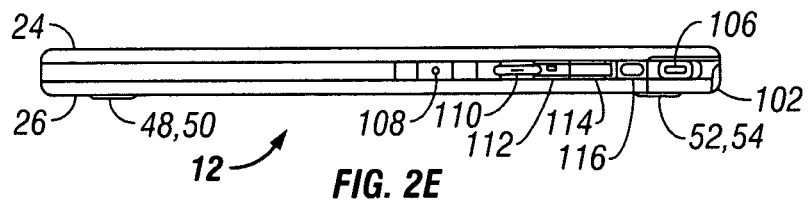

As mentioned above, a user may interact with the tablet computing device 12 without a conventional keyboard or mouse. As illustrated by FIG. 2E, the tablet computing device 12 may have a variety of control buttons, menu scroll and select mechanisms, and other pointing devices to facilitate user interaction without an external user-interaction device. For example, as illustrated, the tablet computing device 12 may comprise a jog dial 108 and functional buttons 110, 112, 114, and 116. The jog dial 108 may be used to scroll through a software menu, pages of text, or other displayed media. The functional buttons 110-116 may have default hardware or software functions, which the user may program to perform any desired hardware or software task. For example, the functional buttons 110-116 may operate as an ESC key, a TAB key, a CRL-ALT-DEL key combination, a RETURN key, a mouse key, or any standard or special key.

In this exemplary embodiment, one of the functional buttons 110-116 triggers a personal information manager, while another one of the functional buttons 110-116 triggers a quick utilities menu. The personal information manager may comprise a variety of user information and user settings, such as a personal calendar, a phone/address book, an e-mail system and log, a phone system and log, user configuration settings, a user document folder, a personal diary, and any other default or user-selected personal information. The quick utilities menu (i.e., "Q" Utilities) provides access to a variety of sort ware and hardware settings in a quick, or short, menu-based format. Accordingly, the quick utilities menu may list hardware and software items, such as wireless functionality, video output, volume control, mute control, brightness control, contrast control, display orientation functionality (e.g., option to switch between portrait and landscape orientations), power properties, quick menu properties, properties of the tablet computing device 12, properties of the keyboard 14, properties of the digitizing pointing device 16, properties of the docking assembly 18, and a variety of functional buttons, such as PrintScreen, Alt+PrintScreen, and Clt+Alt+Del. The foregoing personal information manager and quick utilities menu also may be triggered by an icon displayed on the display screen assembly 22, by one of the digitizer buttons described below, by a button on the digitizing pointing device 16, by a button on the keyboard 14, by wireless control, by voice commands, or by any other suitable user interaction mechanism.

Figure 2F:
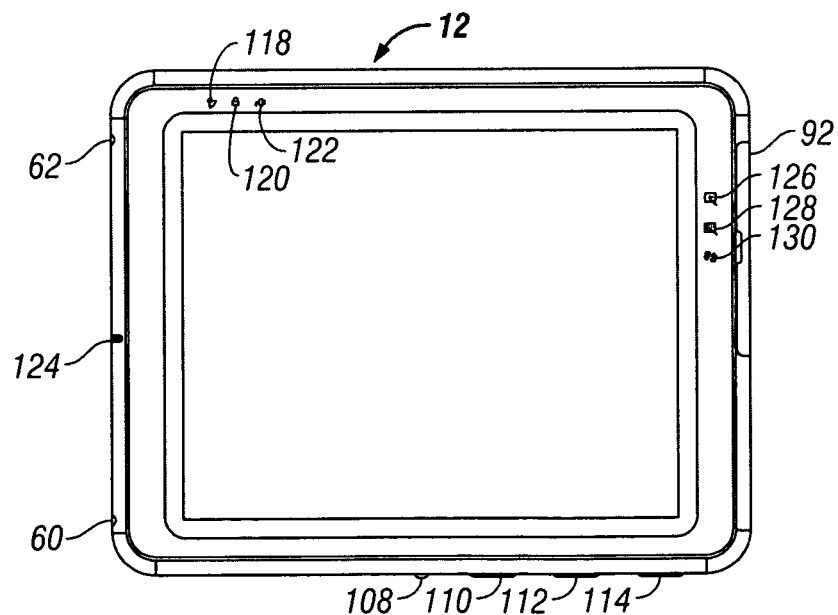
FIG. 2F is a top view of the tablet computing device.

As illustrated by FIG. 2F, the display screen assembly 22 may occupy most of the area on the top side 24 of the tablet computing device 12. However, the tablet computing device 12 may have a variety of status indicators and user interaction devices disposed about the perimeter of the display screen assembly 22. In the illustrated embodiment, the tablet computing device 12 has status indicators 118, 120, and 122, which may comprise illuminable icons (e.g., LEDs, LCD, etc.) corresponding to the desired devices. For example, the status indicators 118, 120, and 122 may correspond to wireless activity, an AC or DC power source, a low battery level, network connectivity, a system error, processor activity, or any other desired status or activity. The illustrated embodiment also has a microphone 124 disposed in a peripheral portion of the housing 20. Moreover, as described in detail below, the tablet computing device 12 comprises a plurality of digitizer-activated buttons, such as digitizer-activated buttons 126, 128, and 130, which are activated by the digitizing pointing device 16. The foregoing digitizer-activated buttons may be associated with any desired hardware or software functions, such as a screen rotation function, a system status change function (i.e., on/off, reset, logoff, standby, etc.), a dock/undock function, a user-interaction mode (e.g., keyboard, voice recognition, digitizer write-to-text conversion, etc.), a software execution function, a hardware configuration function, or any other such functions. For example, the foregoing digitizer-activated buttons may trigger one or both of the personal information manager or the quick utilities menu described above.

Figure 3:
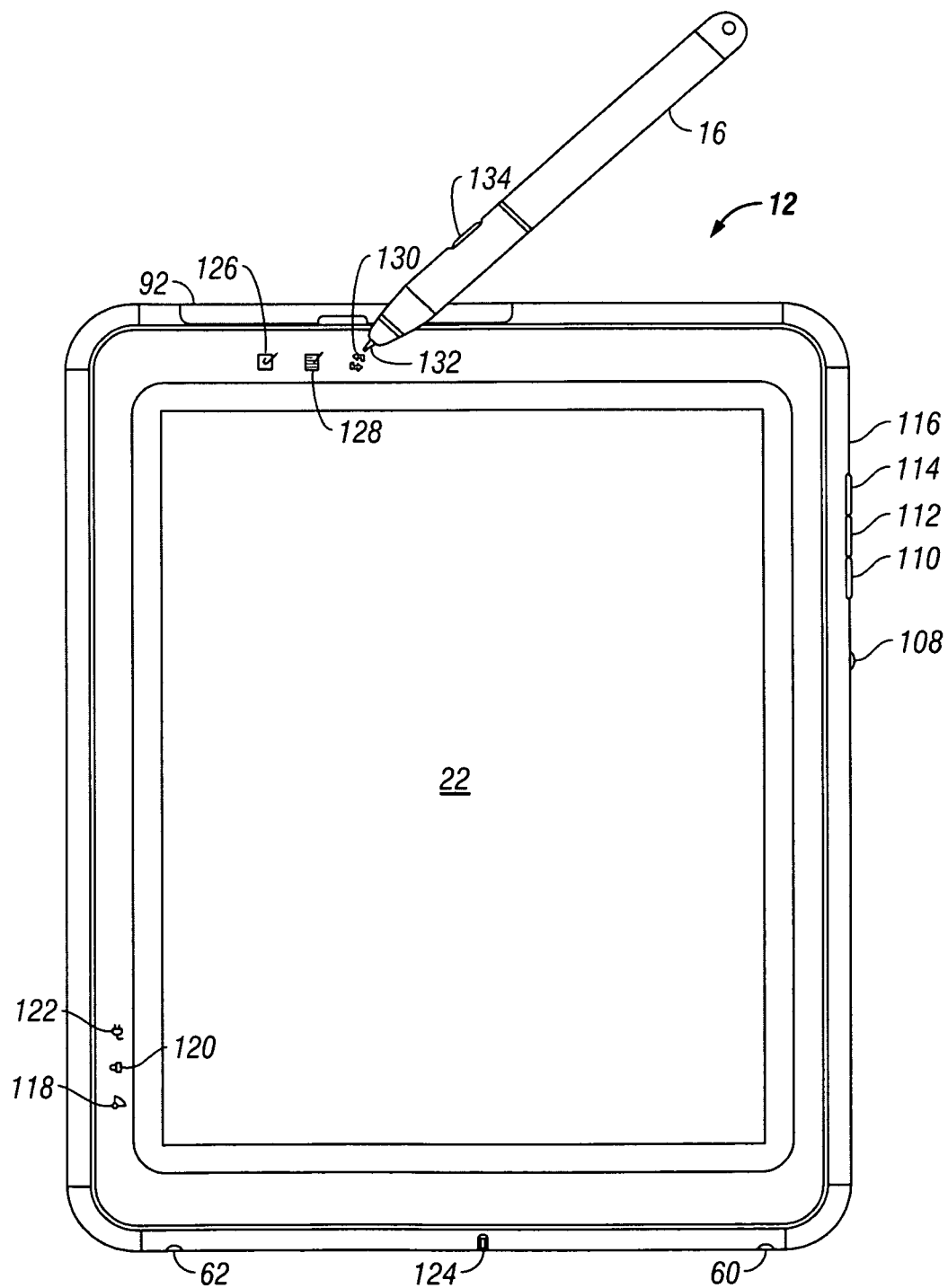
FIG. 3 is a top view of the tablet computing device illustrating interaction between the digitizing pointing device and one of multiple digitizer buttons within the tablet computing device.
Figure 4:
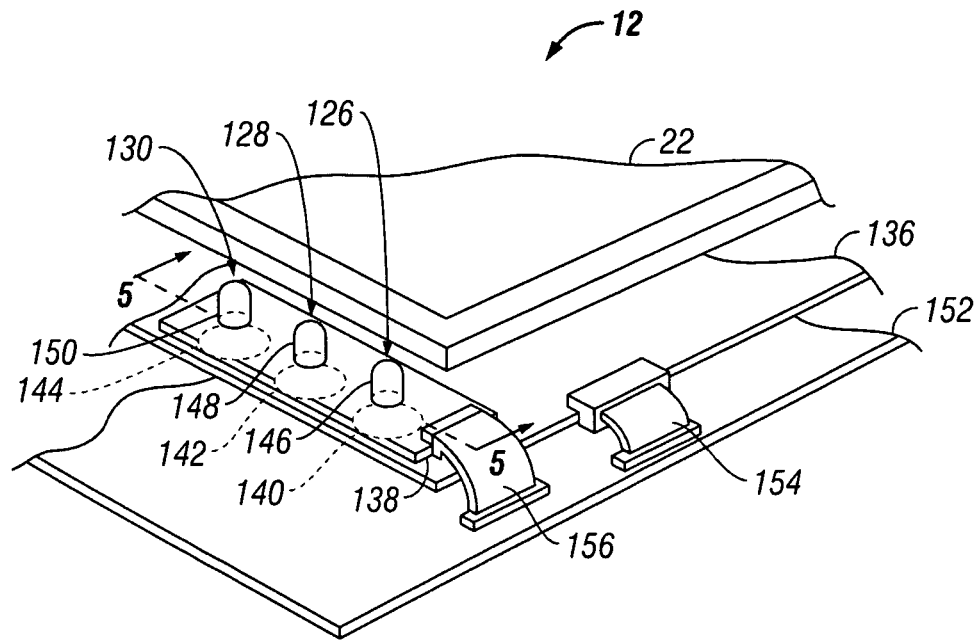
FIG. 4 is a partial internal perspective view of the tablet computing device illustrating a digitizer assembly for the digitizer buttons illustrated by FIG. 3.

FIG. 3 is a top view of the tablet computing device 12 illustrating interaction between the digitizer-activated buttons 126, 128, and 130 and the digitizing pointing device 16. As illustrated, the digitizing pointing device 16 has a tip 132 and one or more buttons, such as select button 134, to facilitate user interaction with the digitizer-activated buttons 126, 128, and 130. The operation of the digitizer-activated buttons 126, 128, and 130 and the digitizing pointing device 16 is illustrated with reference to FIGS. 4-6. FIG. 4 is an internal perspective view of the tablet computing device 12 illustrating the digitizer-activated buttons 126, 128, and 130. As illustrated, a digitizer panel 136 is disposed below, within, or integral with the display screen assembly 22.

The digitizing pointing device 16 interacts with the digitizer panel 132 throughout the dimensions of the display screen assembly 22 for coordination, selection, writing, and other user-interaction with software displayed on the display screen assembly 22. The digitizer panel 136 and the digitizing pointing device 16 may comprise any suitable digitizer technology, such as electric field, ultrasonic, radio frequency, infrared, electrostatic, electromagnetic, or any other existing or emerging technologies. The digitizer panel 136 and the digitizing pointing device 16 may operate by one-way or two-way signal transmissions, in either direction, between the digitizer panel 136 and the digitizing pointing device 16. In this exemplary embodiment, the digitizing pointing device 16 may transmit a wireless signal, which is sensed by the digitizer panel 136 to coordinate the location of the digitizing pointing device 16. The digitizing pointing device 16 also may transmit one or more secondary signals to trigger a select function or any other desired function. For example, a click of the tip 132 or the button 134 may transmit a secondary signal, which triggers a desired function. Alternatively, the present technique may use touch screen technology, which would facilitate user interaction via a standard pen, a finger, or any suitable pointing item.

The digitizer-activated buttons 126, 128, and 130 are provided in a peripheral region 138 of the digitizer panel 136, which has active button regions 140, 142, 144 defined for each of the buttons 126, 128, and 130, respectively. Each of these active button regions 140, 142, and 144 is associated with a desired hardware/software function, such as a default or user-defined function. The digitizer-activated buttons 126, 128, and 130 also may comprise indicators, such as LEDs 146, 148, and 150, which may be illuminated upon triggering or close proximity of the digitizing pointing device 16. For example, one of the LEDs 146-150 may light up when the tip 132 of the digitizing pointing device 16 is near a desired one of the active button regions 140-144, such that a subsequent triggering event will activate the desired button. The digitizer panel 136 and the indicators 146-150 communicate with a motherboard 152 of the tablet computing device 12 via connectors 154 and 156, respectively.

In operation, the digitizing pointing device 16 may trigger one of the digitizer-activated buttons 126, 128, and 130 by touching the top side 24 of the housing 20 above the desired active button region. Again, the indicators 146-150 may light up when the digitizing pointing device is close enough to activate the desired button. Alternatively, the desired active button region may be selected by engaging a switch mechanism in the tip 132 of the digitizing pointing device 16 (e.g., by tapping the tip 132), while the tip 132 is disposed above the desired active button region. The desired active button region also may be triggered by depressing a button, such as button 134, on the digitizing pointing device 16. The digitizing pointing device 16 also may have a separate button for each of the digitizer activated buttons 126, 128, and 130, such that the desired button may be activated remotely simply by depressing the appropriate button on the pointing device 16. Any other suitable triggering mechanism is also within the scope of the present technique.

As described above, the functional components of the digitizer-activated buttons 126, 128, and 130 are disposed within the housing 20, such that the triggering mechanism is entirely remote from such functional components. As such, the digitizer-activated buttons 126, 128, and 130 are more durable than conventional buttons, which require physical contact directly on the buttons. Moreover, the digitizer-activated buttons 126, 128, and 130 are not subject to accidental activation by a user, such as with conventional physical buttons or touch panel buttons.

Figure 5:
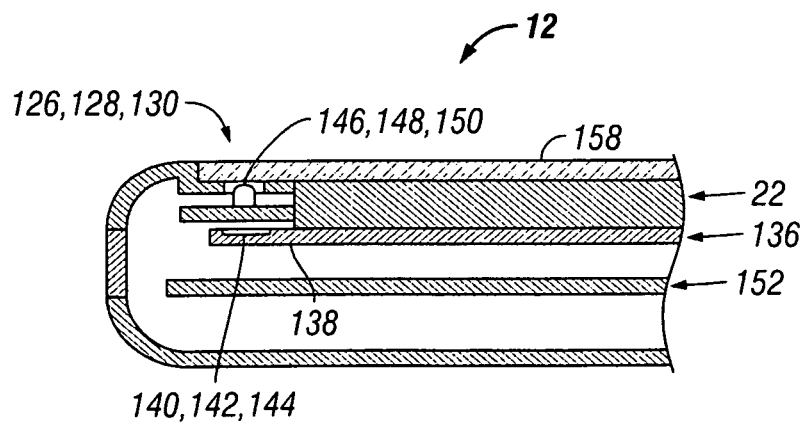
FIG. 5 is a cross-sectional side view of the digitizer assembly illustrated by FIG. 4.

FIG. 5 is a partial cross-sectional view of the tablet computing device 12 in the housing region of the digitizer-activated buttons 126, 128, and 130. As illustrated, the display screen assembly 22 comprises a transparent cover panel 158, which extends over a bezel-structure of the housing 20 between the cover panel 158 and the active button regions 140-144 and LEDs 146-150. As mentioned above, the LEDs 146-150 illuminate button icons, or other insignia, in the transparent cover panel 158 upon triggering or active-positioning of the digitizing pointing device 16 relative to the respective active button regions 140-144. Accordingly, the transparent cover panel 158 may be back-painted with one or more materials, such as antireflective or AR coatings, while the button icons or insignia are differentiated to define the digitizer-activated buttons 126, 128, and 130.

Figures 6A, 6B:
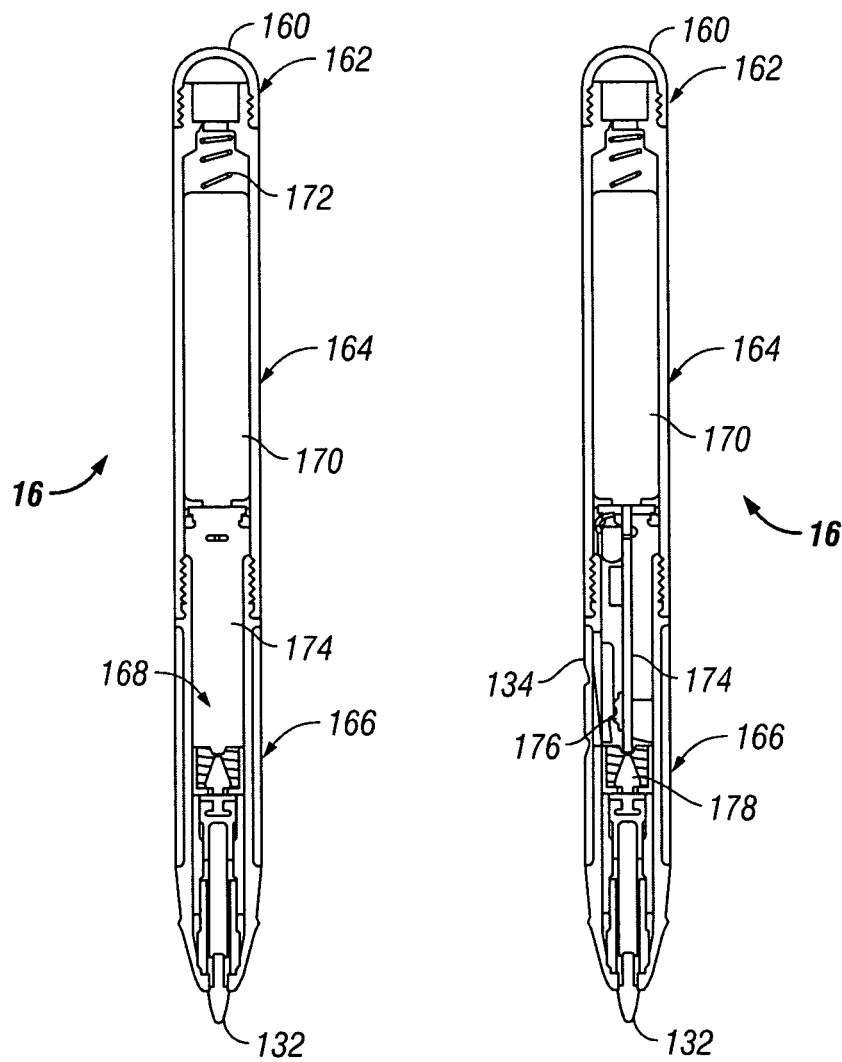
FIGS. 6A and 6B are cross-sectional side views of the digitizing pointing device illustrating internal circuitry and switch mechanisms for interaction with the digitizer assembly of FIGS. 4 and 5.

FIGS. 6A and 6B are cross-sectional views of the digitizing pointing device 16 illustrating internal switch mechanisms for the tip 132 and the button 134. As illustrated, the digitizing pointing device 16 comprises an elongated housing 160 having a threaded end cap 162, a threaded battery section 164 coupled to the cap 162, and a threaded electronics section 164 coupled to the battery section 164. The threaded electronics section 164 comprises electronic circuitry 168, which is powered by a battery 170 that is biased against the electronic circuitry 168 by a spring 172. As illustrated, the electronic circuitry 168 comprises a printed circuit board 174 having digitizing communications circuitry, a switch 176 for the button 134, and a spring-loaded switch 178 for the tip 132.

In this exemplary embodiment, the digitizing pointing device 16 generates a signal that is received and processed by the digitizer panel 136. For example, the digitizing pointing device 16 may be a digitizer pen produced by FinePoint Innovations, Inc. of Tempo, Ariz. In operation, the signal transmitted from the digitizing pointing device 16 identifies the location of the tip 132 relative to the display screen assembly 22 (and subsurface digitizer panel 136), thereby facilitating pointer movement and drawing functions on the display screen. The digitizing pointing device 16 also may be used to select items, to interact with system software, to activate virtual buttons on the screen, to activate digitizer buttons, or to perform a variety of other functions. For example, one or more special signals may be transmitted from the digitizing pointing device 16 upon activating the switch 176 or the spring-loaded switch 178. Although the illustrated digitizing pointing device 16 is described as a signal-generating digitizer device, any suitable pen and panel digitizer system is within the scope of the present technique. For example, the signal may arise in the digitizer panel 136 rather than the digitizing pointing device 16. The present technique also may use touch screen technology and provide the digitizing pointing device 16 as a "dumb" pointing device.

Figure 7:
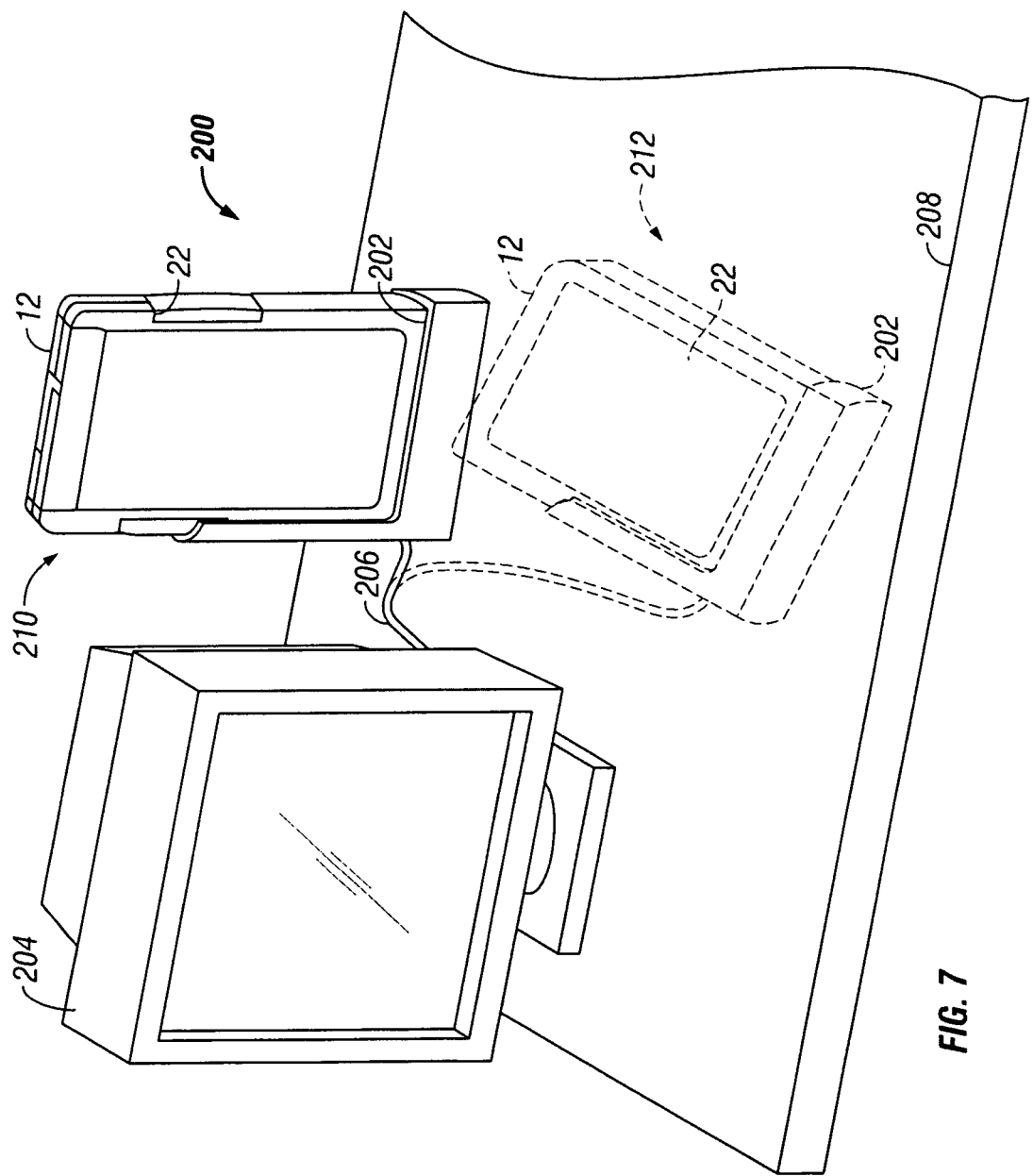
FIG. 7 is a perspective view of the tablet computing device docked with an alternative docking assembly and a monitor.

FIG. 7 is a perspective view of a computer system 200 having the tablet computing device 12 disposed in a multi-positionable docking station 202, which may comprise a variety of computing components, displays, and peripherals. For example, the docking station 202 may be coupled to a desktop computer, a laptop computer, one or more displays, one or more user interaction devices, audio/video peripherals, and a variety of other components. In this exemplary embodiment, the multi-positionable docking station 202 is communicatively coupled to a video display 204 by a video cable 206. The video display 204 may comprise a standard CRT monitor, a flat screen monitor, a flat panel display, or any other suitable video display. Moreover, the display 204 may be positionable in a variety of orientations, such as landscape and portrait orientations.

As illustrated by FIG. 7, the tablet computing device 12 is positionable on a work surface 208 in a variety of user interaction positions, such as an upright dock configuration 210 and an inking dock configuration 212. The upright dock configuration 210 is particularly useful for viewing graphics and text, while the inking dock configuration 212 is useful for user interaction and writing on the display screen 22 with the digitizing pointing device 16. The tablet computing device 12 also may be rotated between various viewing orientations, such as landscape and portrait orientations, in each of the docked and undocked configurations.

In response to a dock/undock event or a physical rotation of the tablet computing device 12, the present technique may initiate a real-time automatic change of the display, viewing, and operational configuration of the computer system 200. For example, the present technique may change display settings, application settings, and a variety of other system settings for the display screen 22 and/or the video display 204. The computer system 200 may detect the dock/undock event or the physical rotation by any suitable hardware or software detection mechanism. For example, the operating system may monitor the connection state of a docking connector between the tablet computing device 12 and the multi-positionable docking station 202. In one exemplary embodiment, a hardware signal may be checked by BIOS to determine the viewing orientation (i.e., portrait or landscape), the user interaction orientation (i.e., viewing or writing mode), and the docking state of the tablet computing device 12. One or more sensors also may be placed on various surfaces of the tablet computing device 12 and the multi-positionable docking station 202 to sense a particular orientation on the work surface 208. Alternatively, one or more switches may be placed on various surfaces of the tablet computing device 12 and the multi-positionable docking station 202 to initiate a configuration change or profile switch upon placing the tablet computing device 12 on the work surface 208 in a particular orientation.

Figure 8:
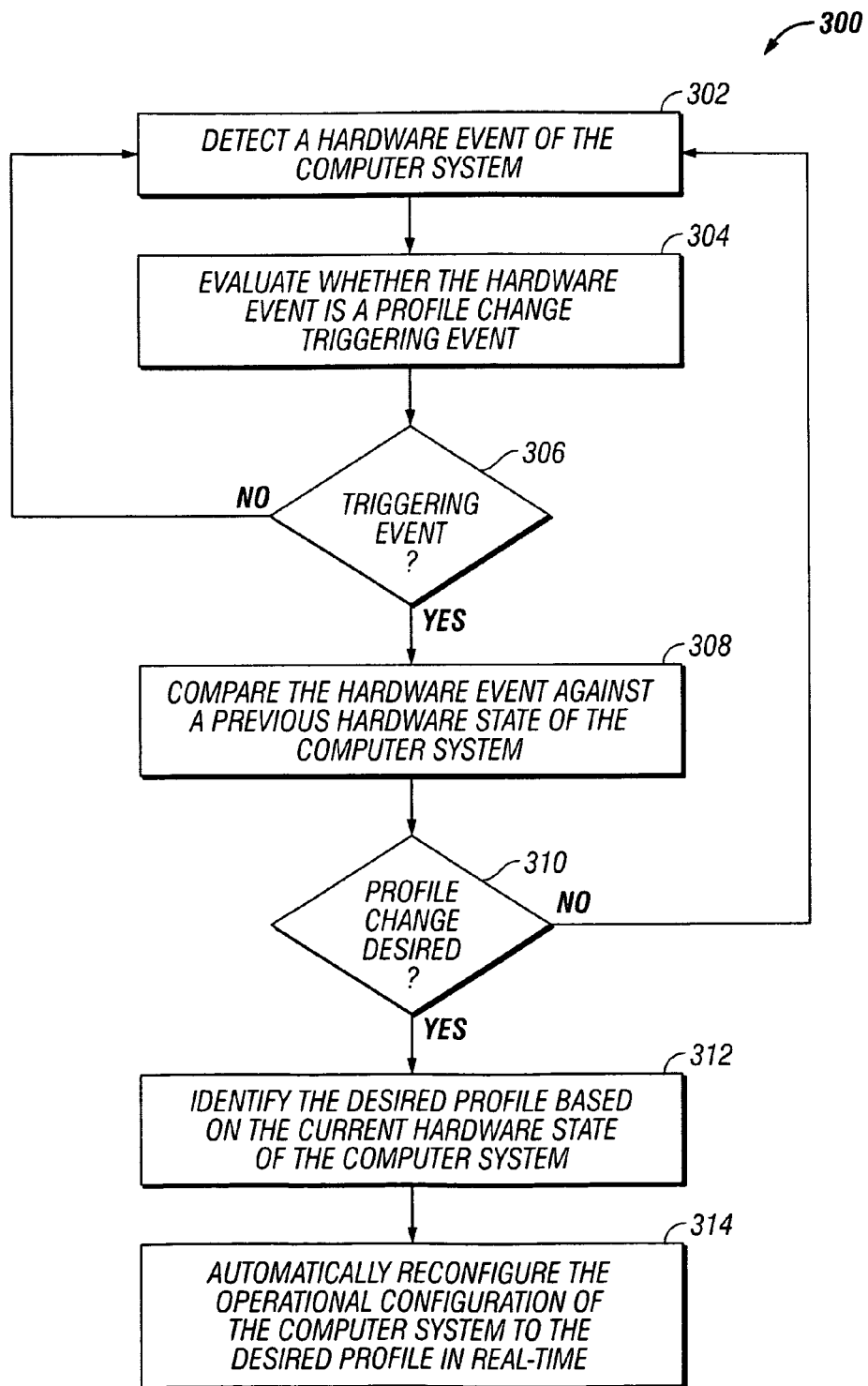
FIG. 8 is a flow chart illustrating an exemplary profile switching process for automatically changing display profiles of the tablet computing device in real-time.

FIG. 8 is a flowchart illustrating an exemplary automatic reconfiguration process 300 of the present technique. As illustrated, the process 300 proceeds by detecting a hardware event of the computer system (block 302). For example, the operating system may detect the presence or absence of a hardware component upon booting the system or it may detect the removal, attachment, connection, disconnection, or rearrangement of a hardware component in real-time during operation of the system. In an exemplary embodiment, the process 300 may detect a real-time rotation of the tablet computing device 12 between landscape and portrait orientations of the display screen 22. The process 300 also may detect a real-time docking or undocking of the tablet computing device 12 with the multi-positionable docking station 202 in either the upright dock configuration 210, the inking dock configuration 212, or any other desired docked/undocked configuration. For example, the process 300 may detect a sliding motion of the tablet computing device 12 onto the work surface 208 into the inking dock configuration 212. Again, the process 300 may detect a particular hardware event upon occurrence, upon booting the computer system 200, upon launching a particular application, or at any desired time.

After detecting a hardware event such as a hardware detection signal/interrupt at block 302, the process 300 evaluates whether the hardware event is a profile change triggering event (block 304). If the particular hardware event is not one of the default or custom triggering events at query block 306, then the process 300 continues to monitor for another hardware event at block 302. If the hardware event is one of the default or custom triggering events at query block 306, then the process 300 proceeds to compare the hardware event against a previous hardware state of the computer system (block 308). At query block 310, the process 300 analyzes whether the profile change is desired based on previous and existing hardware states of the computer system 200. If a profile change is not warranted by the hardware event, then the process 300 continues to monitor for another hardware event at block 302. If a profile change is warranted by the hardware event, then the process 300 proceeds to identify the desired profile based on the current hardware state of the computer system (block 312). The process 300 then automatically reconfigures the operational configuration of the computer system to the desired profile (block 314). Each profile may have a variety of system settings, application settings, display settings, and various other configuration settings. Moreover, each profile may have a number of active applications that are displayed in one or more of the various displays.

The automatic reconfiguration process 300 described above with reference to FIG. 8 is applicable to a variety of hardware events. In certain cases, a profile change may not be warranted by a particular hardware event. Accordingly, the process 300 may utilize a variety of hardware state comparisons and profile switching parameters to prevent improper or undesirable profile changes. The process 300 may evaluate whether the detected hardware event is associated with an actual reconfiguration of the computer system that warrants a profile switch. If the tablet computing device 12 is merely repositioned in the same configuration, for example, then no profile change is warranted.

The triggering events may occur if the system is in an S0 ACPI state, if the system is in an S3 or lower state when the hardware event occurs, then the event may be queued for a subsequent profile change when the system is returned to the S0 state. The present technique may prevent undesirable profile changes by saving a previous state before proceeding into the S3 state and the queued state. Upon returning the system into the S0 state, the process 300 evaluates the saved previous state against the returning state. If the states are the same, then the process 300 does not execute a profile change.

Figure 9:
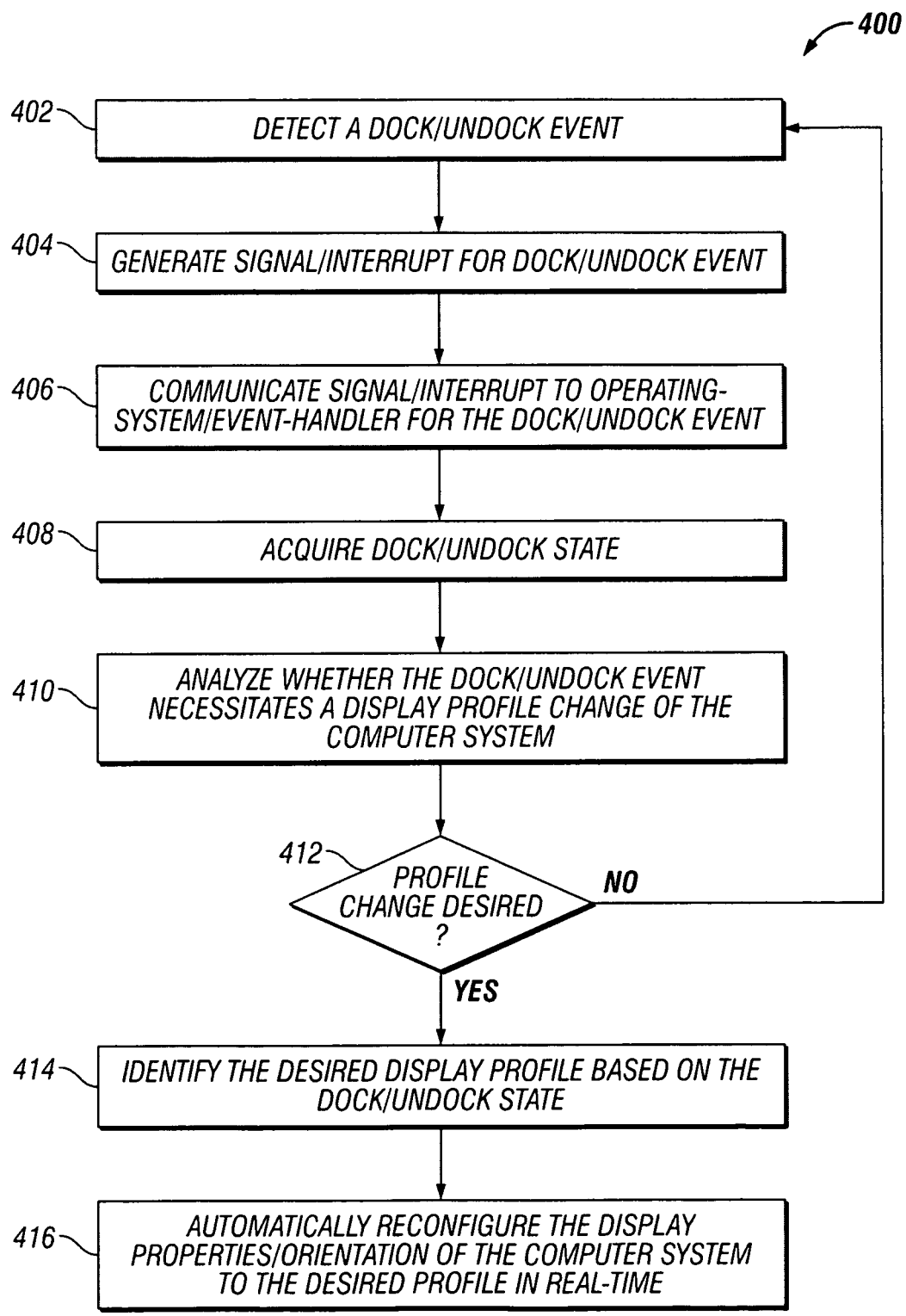
FIG. 9 is a flowchart illustrating an exemplary automatic real-time display profile reconfiguring process of the present technique.

FIG. 9 is a flowchart illustrating an exemplary automatic display profile switching process 400 of the present technique. As illustrated, the process 400 proceeds by detecting a dock/undock event of the computer system (block 402). For example, the process 400 may detect a switch change or a docking/undocking of the tablet computing device 12 with the multi-positionable docking station 202 in either the upright dock configuration 210, the inking dock configuration 212, or any other desired docked/undocked configuration. The process 400 then generates a signal/interrupt (e.g., an SC1) for the dock/undock event (block 404). The signal/interrupt may be any suitable identifying signal or interrupt for the particular dock or undock event. The process 400 then proceeds to communicate a signal/interrupt to the operating system and event handler for the dock/undock event (block 406). For example, the operating system may receive an SC1 for the hardware event and run an ACPI handler for the hardware event in ASL code. The process 400 also may communicate a signal/interrupt to the video driver(s) for the tablet computing device 12 and the video display 204. After communicating the signal/interrupt, the process 400 may proceed to acquire the dock/undock state of the computer system (block 408). For example, the video driver may identify the system event and pass the appropriate information to a profile changing application, such as a display view change utility (e.g., a tablet computer view change interface—TabView). However, any one or more software or hardware components may be used to identify or acquire the previous or existing dock/undock state of the computer system.

The process 400 then analyzes whether the dock/undock event triggers a display profile change of the computer system (block 410). If the particular dock/undock event does not warrant a display profile change at query block 412, then the process 400 continues to monitor for another dock/undock event at block 402. If the dock/undock event is a triggering event for a display profile change, then the process 400 proceeds to identify the desired display profile based on the dock/undock state of the computer system (block 414). The process 400 then automatically reconfigures the display properties/orientation of the computer system to the desired profile (block 416). Each profile may have a variety of system settings, application settings, display settings, and various other settings. Moreover, each profile may have a number of active applications that are displayed in one or more of the various displays.

Figure 10:
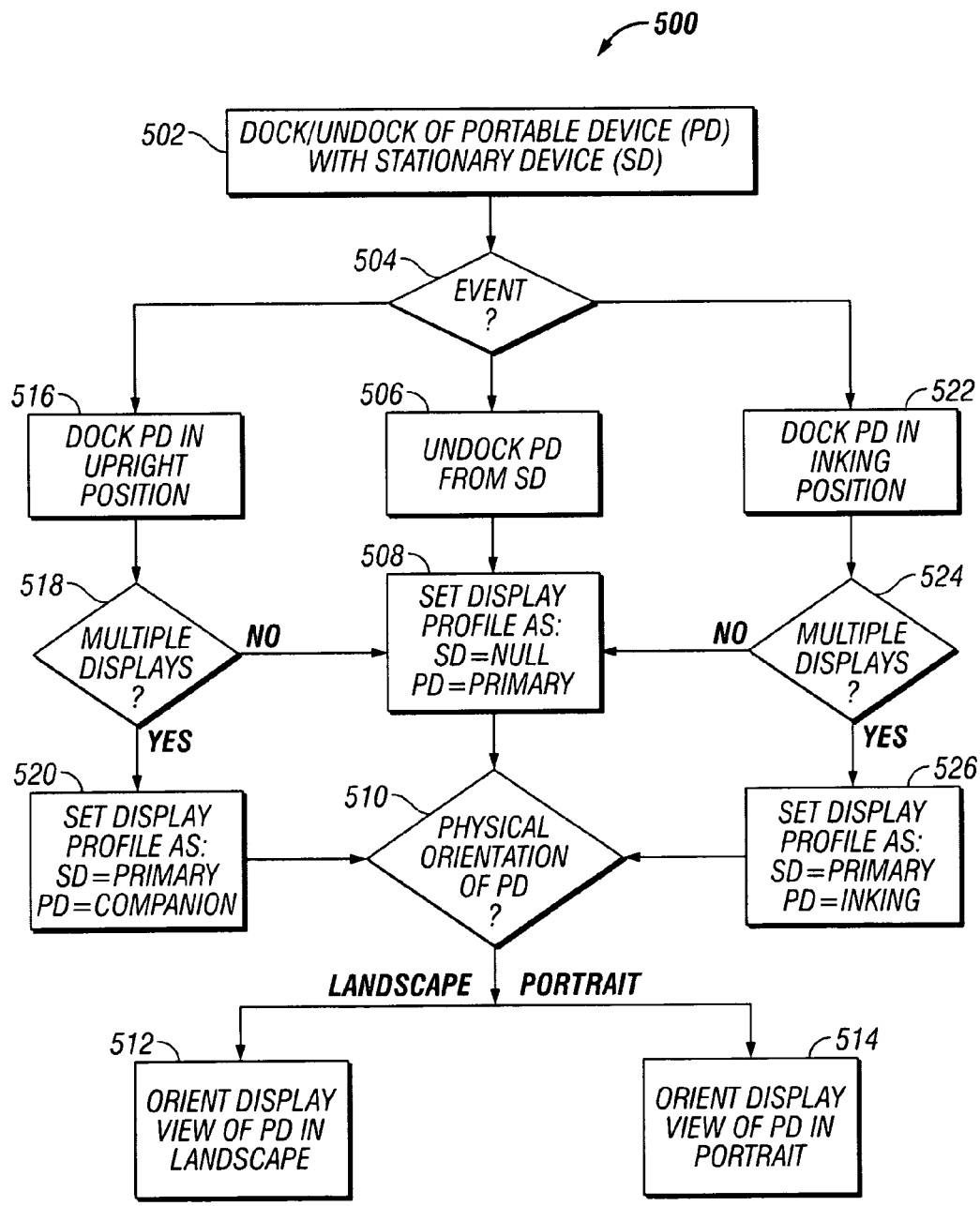
FIG. 10 is a flowchart illustrating an exemplary automatic view reconfiguring process for a computer system.

FIG. 10 is a flowchart illustrating an exemplary automatic multi-display view setting process 500 for the computer system 200. As illustrated, the process 500 proceeds as a user reconfigures, switches, or docks/undocks a portable device (PD) with a stationary device (SD) at block 502. The process 500 then evaluates the particular dock or undock event at query block 504. If the user undocks the portable device from the stationary device at block 506, then the process 500 proceeds to set the display profile of the computer system as having no stationary device and as having the portable device as the primary display (block 508). As discussed in further detail below with reference to FIGS. 11 and 12, the display profile may comprise a variety of display view settings, application settings, and other system properties for the portable and stationary devices. The process 500 then proceeds to identify the physical orientation of the portable device at query block 510. If the user has repositioned the portable device in a landscape orientation, then the process 500 detects the landscape reconfiguration via one or more sensors, switches, or other hardware/software detection mechanisms. The process 500 then automatically orients the display view of the portable device in a landscape viewing orientation in real-time (block 512). If the user has repositioned the portable device in a portrait orientation, then the process 500 detects the portrait reconfiguration via one or more sensors, switches, or other hardware/software detection mechanisms. The process 500 then automatically orients the display view of the portable device in a portrait viewing orientation in real-time (block 514). The process 500 also may perform a variety of other automatic system configuration operations in response to the undock event 506.

If the user docks the portable device in an upright position with the stationary device at block 516, then the process 500 detects the upright docked reconfiguration via one or more sensors, switches, or other hardware/software detection mechanisms. The process 500 then proceeds to analyze whether the computer system has multiple displays (block 518). If the computer system does not have multiple displays, then the process 500 proceeds to set the display profile of the computer system as having no display at the stationary device and as having the portable device as the primary display (block 508). If the computer system does have multiple displays, then the process 500 proceeds to set the display profile of the computer system as having the stationary device as the primary display and as having the portable device as the companion display (block 520). As discussed in further detail below with reference to FIGS. 11 and 12, the display profile may comprise a variety of display view settings, application settings, and other system properties for the portable and stationary devices.

After setting the display profile at block 508 or block 520, the process 500 proceeds to identify the physical orientation of the portable device at query block 510. If the user has repositioned the portable device in a landscape orientation, then the process 500 detects the landscape reconfiguration via one or more sensors, switches, or other hardware/software detection mechanisms. The process 500 then automatically orients the display view of the portable device in a landscape viewing orientation in real-time (block 512). If the user has repositioned the portable device in a portrait orientation, then the process 500 detects the portrait reconfiguration via one or more sensors, switches, or other hardware/software detection mechanisms. The process 500 then automatically orients the display view of the portable device in a portrait viewing orientation in real-time (block 514). The process 500 also may perform a variety of other automatic system configuration operations in response to the upright dock event 516.

If the user docks the portable device in an inking/writing position with the stationary device at block 522, then the process 500 detects the inking/writing docked reconfiguration via one or more sensors, switches, or other hardware/software detection mechanisms. The process 500 then proceeds to analyze whether the computer system has multiple displays (block 524). If the computer system does not have multiple displays, then the process 500 proceeds to set the display profile of the computer system as having no display at the stationary device and as having the portable device as the primary display (block 508). If the computer system does have multiple displays, then the process 500 proceeds to set the display profile of the computer system as having the stationary device as the primary display and as having the portable device as the inking/writing display (block 526). As discussed in further detail below with reference to FIGS. 11 and 12, the display profile may comprise a variety of display view settings, application settings, and other system properties for the portable and stationary devices.

After setting the display profile at block 508 or block 526, the process 500 proceeds to identify the physical orientation of the portable device at query block 510. If the user has repositioned the portable device in a landscape orientation, then the process 500 detects the landscape reconfiguration via one or more sensors, switches, or other hardware/software detection mechanisms. The process 500 then automatically orients the display view of the portable device in a landscape viewing orientation in real-time (block 512). If the user has repositioned the portable device in a portrait orientation, then the process 500 detects the portrait reconfiguration via one or more sensors, switches, or other hardware/software detection mechanisms. The process 500 then automatically orients the display view of the portable device in a portrait viewing orientation in real-time (block 514). The process 500 also may perform a variety of other automatic system configuration operations in response to the inking/writing dock event 522.

Figure 11:
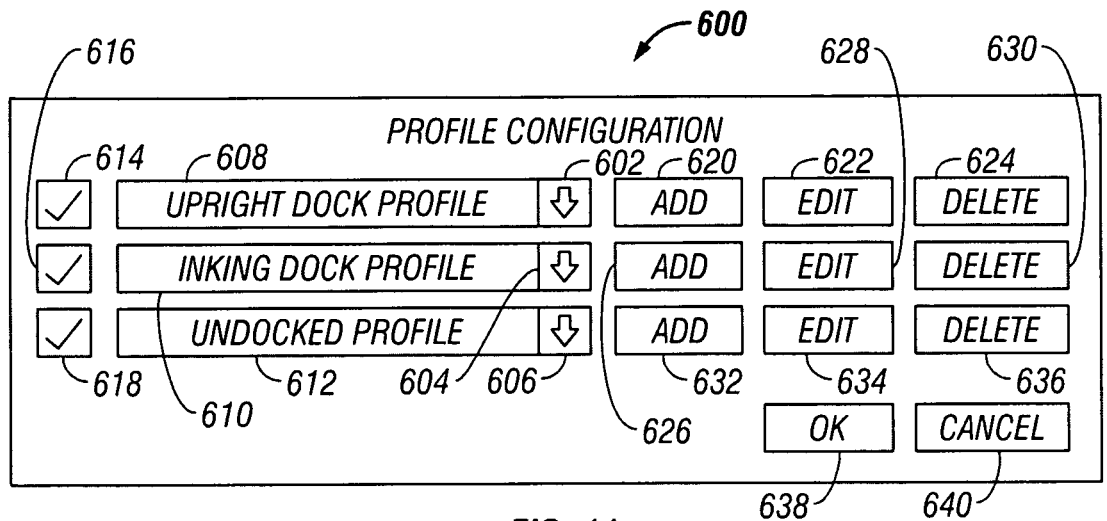
FIG. 11 illustrates an exemplary profile configuration interface of the present technique.

Any suitable software or hardware may be implemented to perform the foregoing automatic profile changes, as discussed with reference to FIGS. 7-10. For example, the present technique may use a variety of graphical user interfaces based on object-oriented programming code, which facilitates the automatic profile changes. FIG. 11 illustrates an exemplary profile configuration interface 600 of the present technique. As illustrated, the profile configuration interface 600 has options to enable, add, edit, and delete profiles for each of the docked and undocked configurations illustrated by FIG. 10. One or more profiles may be preprogrammed and set to default profiles, while the user also may provide one or more custom profiles. For example, the profile configuration interface 600 has drop-down menus 602, 604, and 606 for upright dock profiles 608, inking dock profiles 610, and undocked profiles 612, respectively. A user may enable or disable any of the profiles 608, 610, and 612 by checking or unchecking an appropriate one of check boxes 614, 616, and 618, respectively. The user also may add, edit, or delete an upright dock profile to the drop-down menu 602 via buttons 620, 622, and 624, respectively. Similarly, the user may add, edit, or delete an inking/writing dock profile to the drop-down menu 604 via buttons 626, 628, and 630, respectively. The user also may add, edit, or delete an undocked profile to the drop-down menu 606 via buttons 632, 634, and 636, respectively. The interface 600 also may provide one or more default profiles for each of the drop-down menus 602, 604, and 606. If the user accepts the existing and/or changed settings to the profile configuration, then the user may click on an OK Button 638. Otherwise, the user may cancel the configuration operation by clicking on a Cancel Button 640.

Figure 12:
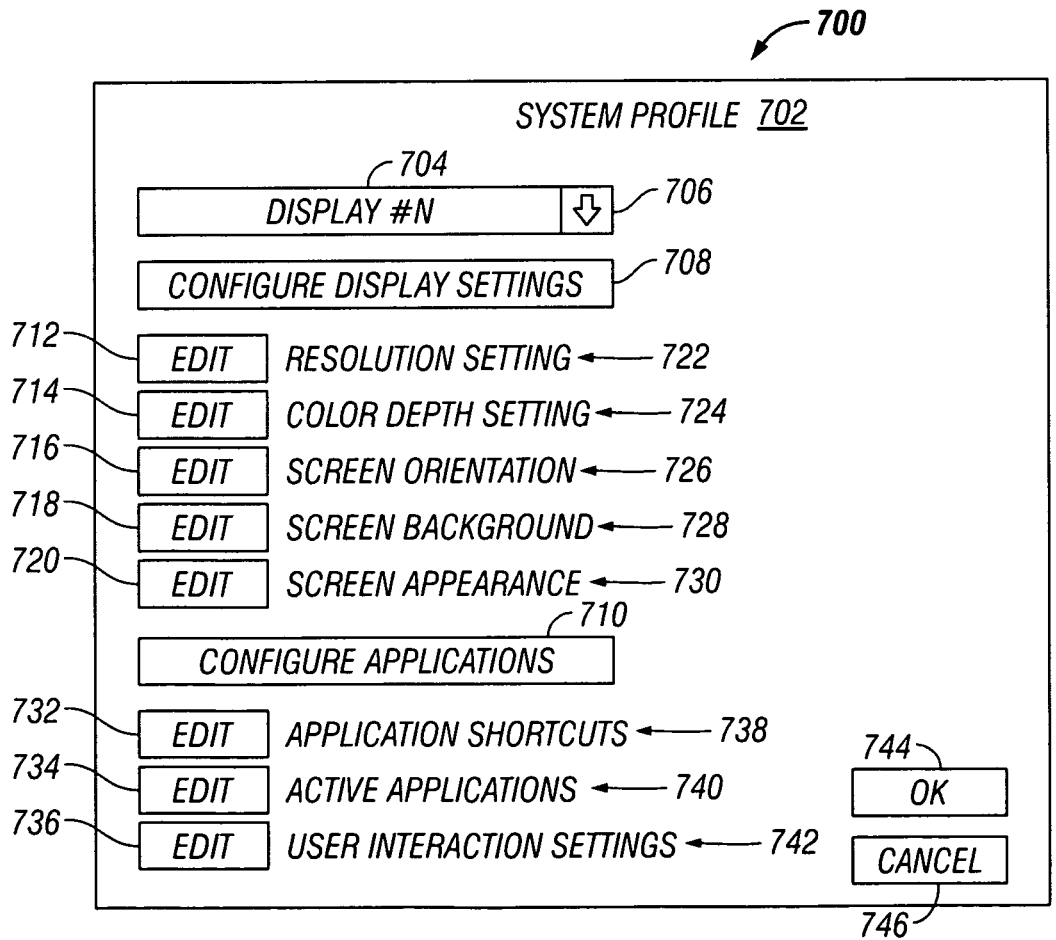
FIG. 12 illustrates an exemplary system profile setting interface of the present technique.

For each profile listed in each of the drop-down menus 602, 604, and 606, the user can edit a variety of display settings, application settings, and various other system settings for each video display in the computer system. FIG. 12 illustrates an exemplary system profile setting interface 700 of the present technique. The interface 700 may launch upon clicking the add or edit buttons for any one of the profiles listed in the drop-down menus 602, 604, and 606. If the selected profile of the computer system has multiple displays, then the user can add, edit, or modify system profile information 702 for each display 704 listed in a drop-down menu 706 for that particular system profile. Otherwise the user simply adds, edits, or modifies the system profile information 702 for the single display, such as the display screen 22 of the tablet computing device 12.

As illustrated, the interface 700 has buttons 708 and 710 to launch one or more custom or existing hardware configuration utilities for configuring display settings and for configuring applications of the computer system, respectively. The interface 700 also may have buttons 712, 714, 716, 718, and 720 for editing a resolution setting 722, a color depth setting 724, a screen orientation 726 (e.g., a portrait or landscape view), a screen background 728, and a screen appearance/theme 730, respectively. Accordingly, the user may edit individual display settings via buttons 712-720 rather than through the general utility launched by button 708. The interface 700 also may provide buttons or options for any other desired display settings.

The interface 700 also may have buttons 732, 734, and 736 for editing application shortcuts 738, for setting active applications 740, and for editing user interaction settings 742, respectively. The user may set up application short cuts, active applications, and various user input devices (e.g., a keyboard, a mouse, the digitizing pointing device 16, etc.) for each display of the computer system 12 in a particular docked or undocked configuration. For example, in an inking/writing position, the active application for the tablet computing device 12 may be an email program, a word processing program, a writing program using the digitizer pointing device 16, a personal information manager, or a variety of other software applications. If the user accepts the existing and/or changed settings to the system profile 702, then the user may click on an OK Button 744. Otherwise, the user may cancel the configuration operation by clicking on a Cancel Button 746. The interface 700 also may provide buttons or options for any other desired application settings.

Figure 13:
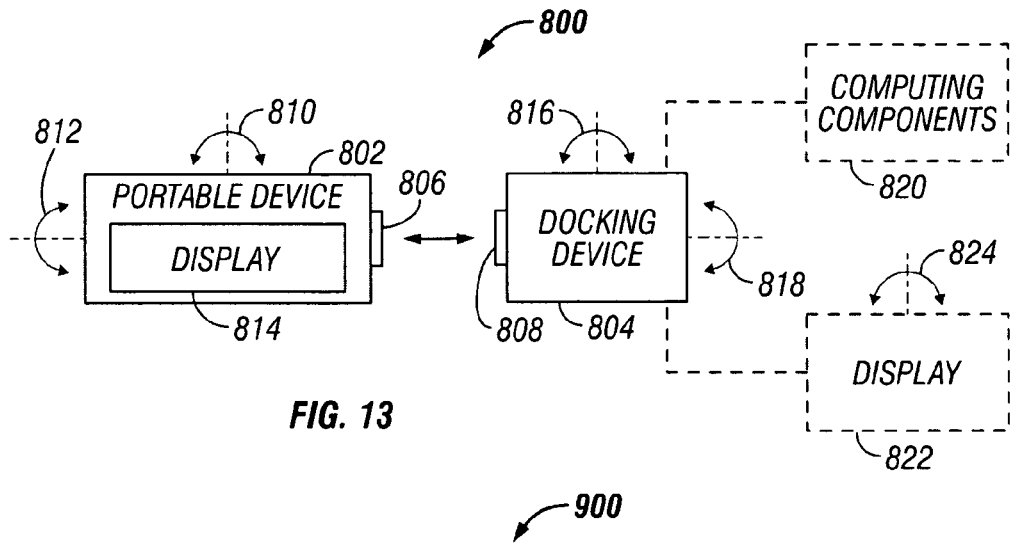
FIG. 13 is a diagram of an exemplary system having a portable device dockable with a docking device utilizing unique aspects of the present technique.
Figure 14:
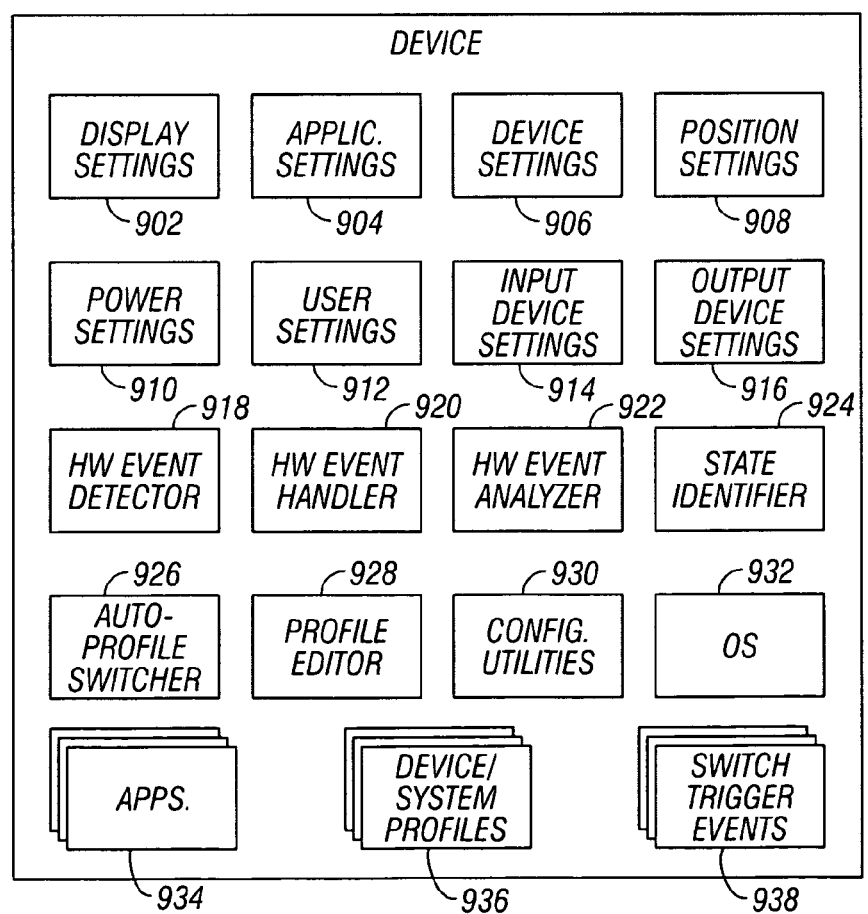
FIG. 14 is a diagram of a device having exemplary automatic profile switching mechanisms of the present technique.

FIGS. 13 and 14 illustrate an exemplary system of devices utilizing the foregoing automatic profile switching mechanisms of the present technique. As illustrated by FIG. 13, the present technique may be utilized in a system 800 having a portable device 802 dockable with a docking device 804 via intercoupleable docking connectors 806 and 808, respectively. As discussed above, the automatic profile switching mechanisms of the present technique are responsive to a variety of hardware events, such as docking/undocking events and various repositioning and mounting of the system devices. Accordingly, the portable device 802 may be rotatable between landscape and portrait viewing orientations as indicated by arrow 810. The portable device 802 also may be movable between one or more viewing orientations (e.g., an upright orientation) and one or more writing orientations (e.g., a generally horizontal orientation) as indicated by arrow 812. In each of these different orientations, a display 814 of the portable device 802 may be configured differently by the automatic profile switching mechanisms. Similarly, the docking device 804 may be movable or rotatable between one or more user interaction positions as indicated by arrows 816 and 818. The docking device 804 also may comprise a variety of electronics, circuitry, components, and peripherals. For example, the docking device 804 may have computing components 820 disposed in an integral or separate enclosure. The docking device 804 also may have one or more video devices, such as a display 822. The display 822 may be a standard CRT monitor, a flat screen monitor, a flat panel display, or any other suitable display device. Moreover, the display 822 may be movable or rotatable between a variety of orientations, such as landscape and portrait orientations, as indicated by arrow 824.

One or both of the portable device 802 and the docking device 804 also may have variety of components to facilitate the automatic profile switching process described above with reference to FIGS. 7-13. FIG. 14 is a diagram of a device 900 having exemplary configuration data and automatic profile switching mechanisms of the present technique. As illustrated, the device 900 comprises display settings 902, application settings 904, device settings 906, position settings 908, power settings 910, user settings 912, input device settings 914, output device settings 916, a hardware event detector 918, a hardware event handler 920, a hardware event analyzer 922, a system state identifier 924, an automatic profile switcher 926, a profile editor 928, a variety of hardware configuration utilities 930, an operating system 932, a variety of software applications 934, a plurality of device/system configuration profiles 936, and a plurality of profile switching trigger events 938.

The display settings 902 may comprise any configuration parameters affecting the images and text displayed on a display screen of the device 900. The application settings 904 may comprise any configuration parameters affecting the operation of a particular application, the screen placement of the application, the launching of the application, or any other operational parameters. The device settings 906 relate to various device-specific configuration parameters, applications, and operational characteristics for the device 900. The position settings 908 relate to landscape versus portrait orientations of the display, viewing versus writing orientations of the display, active applications in each of the orientations, and various other positional settings of a display screen of the device 900.

The hardware event detector 918 may comprise a variety of hardware and software modules, which actively or passively monitor or detect hardware changes that may warrant a configuration change of the device 900 or other components in the system 800. The hardware event handler 920 may comprise signaling modules, communication modules, addressing modules, and various other handling mechanisms to receive and notify the system of a particular hardware event. The hardware event analyzer 922 may comprise comparison modules and various other processing modules to determine whether the particular hardware event is a triggering event for a profile change. The system state identifier 924 may comprise a variety of hardware and software mechanisms that identify a pre-existing or current operational and/or physical orientation state of the system and its various devices.

The automatic profile switcher 926 may comprise a variety of programming routines, visual interfaces, and links to other hardware and software to facilitate an automatic reconfiguration of the system and its devices in response to a hardware event. For example, the automatic profile switcher 926 may have links to the profile editor 928, the hardware configuration utilities 930, the device/system profiles 936, and the profile switching trigger events 938. The profile editor 928 may comprise any suitable interface for creating and modifying configuration profiles as discussed with reference to FIGS. 11 and 12. The hardware configuration utilities 930 may comprise a variety of custom or pre-existing software utilities for hardware, such as volume controls, display configuration utilities, communication controls, docking configuration utilities, power configuration utilities, user setting utilities, input device configuration utilities, output device configuration utilities, device-specific configuration utilities, and various other operational control utilities. Again, the device/system configuration profiles 936 may comprise a variety of hardware and software settings, which may be changed by the automatic profile switcher 926 in response to one of the profile switching trigger events 938. The trigger events 938 may comprise dock/undock events, mount/unmount events, position/reposition events, screen orientation events, multi-display events, and any other suitable hardware or software event.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. The present technique is applicable to a wide variety of computer systems and connectable electronic devices, which may benefit from having different profile settings for the various configurations. Moreover, the present technique may use any suitable triggering mechanism for an automatic profile change. The various profiles may comprise display settings, hardware settings, software settings, and various other operational settings for the device(s).

What is claimed is:

1. A method executed by a computer system, comprising:
   detecting, by the computer system, a docking event between a tablet computer and a multi-positionable docking station;
   detecting, by the computer system, a positional state of the tablet computer in the multi-positionable docking station; and
   automatically changing, by the computer system, a viewing orientation between portrait and landscape orientations of images being displayed on a display of the tablet computer upon detecting the docking event to ensure that text and images are displayed in an upright and readable orientation for a user,
   wherein the act of detecting the docking event comprises the act of sensing a coupling of the tablet computer and another display.

2. The method of claim 1, wherein the act of detecting the docking event comprises the act of sensing a decoupling of the tablet computer from the multi-positionable docking station.

3. The method of claim 1, wherein the act of detecting the positional state comprises the act of identifying an upright or writing screen surface position of the display, wherein the upright screen surface position includes a substantially vertical plane orientation with respect to a work surface, and wherein the writing screen surface position includes a substantially horizontal plane orientation with respect to the work surface.

4. The method of claim 1, wherein the act of detecting the positional state comprises the act of identifying an orientational state of the display as either a landscape or portrait orientation.

5. The method of claim 1 further comprising, choosing a writing configuration enabling user input by a computer pen for the display.

6. The method of claim 1 further comprising, launching at least one software application on the display.

7. The method of claim 1 further comprising, reinitializing viewing properties of the display.

8. A method executed by a computer system, comprising:
   detecting, by the computer system, a change of a physical configuration of the computer system including docking or undocking a mobile device with a multi-positionable docking device of the computer system, wherein the mobile device includes a first display and the multi-positionable docking device selectively includes a second display; and
   automatically changing, by the computer system, a viewing orientation between portrait and landscape orientations of images being displayed on the first display upon detecting the changing of the physical configuration to ensure that text and images are displayed in an upright and readable orientation of the first display for a user.

9. The method of claim 8, wherein the act of changing the physical configuration comprises the act of rotating the mobile device between landscape and portrait viewing orientations while the mobile device is docked with the multi-positionable docking device.

10. The method of claim 8, wherein the act of changing the physical configuration comprises the act of moving the mobile device between viewing and writing orientations, wherein the viewing orientation includes a generally vertical plane orientation of the first display with respect to a work surface that supports the mobile device, and wherein the writing position includes a generally horizontal plane orientation of the first display with respect to the work surface.

11. The method of claim 8, comprising the act of selecting a view profile for at least one of a plurality of different physical configurations of a computer system.

12. The method of claim 8, comprising the act of creating a view profile for a tablet computing device in each of a plurality of docked and undocked positions.

* * * * *